(12) United States Patent
Kronz

(10) Patent No.: US 6,675,196 B1
(45) Date of Patent: Jan. 6, 2004

(54) UNIVERSAL PROTOCOL FOR ENABLING A DEVICE TO DISCOVER AND UTILIZE THE SERVICES OF ANOTHER DEVICE

(75) Inventor: Jason A. Kronz, Lawrenceville, GA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/369,118

(22) Filed: Aug. 5, 1999

Related U.S. Application Data

(60) Provisional application No. 60/115,106, filed on Jan. 8, 1999.

(51) Int. Cl.[7] .............................................. G06F 15/16
(52) U.S. Cl. ..................... 709/203; 709/200; 709/219; 709/226; 709/227; 709/237; 709/319; 709/320
(58) Field of Search ................................ 709/200–203, 709/217–219, 226–230, 237, 313, 319–320, 330

(56) References Cited

U.S. PATENT DOCUMENTS

| | | | | |
|---|---|---|---|---|
| 5,546,583 A | * | 8/1996 | Shriver ........................ | 709/313 |
| 5,732,219 A | * | 3/1998 | Blumer et al. .............. | 709/227 |
| 5,758,083 A | | 5/1998 | Singh et al. | |
| 5,898,835 A | * | 4/1999 | Truong ........................ | 709/217 |
| 6,038,595 A | * | 3/2000 | Ortony ........................ | 709/218 |
| 6,154,738 A | | 11/2000 | Call | |
| 6,154,768 A | * | 11/2000 | Chen et al. .................. | 709/203 |
| 6,157,618 A | | 12/2000 | Boss et al. | |
| 6,202,094 B1 | * | 3/2001 | Grosser, Jr. et al. ......... | 709/226 |
| 6,338,089 B1 | * | 1/2002 | Quinlan ...................... | 709/227 |
| 6,347,339 B1 | * | 2/2002 | Morris et al. ................ | 709/237 |
| 6,351,771 B1 | | 2/2002 | Craddock et al. | |
| 6,359,892 B1 | | 3/2002 | Szlam | |
| 6,412,007 B1 | | 6/2002 | Bui et al. | |
| 6,430,409 B1 | | 8/2002 | Rossmann | |
| 6,466,971 B1 | * | 10/2002 | Humpleman et al. ....... | 709/203 |

FOREIGN PATENT DOCUMENTS

EP  1003114  5/2000

OTHER PUBLICATIONS

U.S. patent application Ser. No. 09/369,114, Kronz, filed Aug. 5, 1999.

* cited by examiner

Primary Examiner—Bharat Barot
(74) Attorney, Agent, or Firm—Perkins Coie LLP

(57) ABSTRACT

A method and apparatus for enabling any of a variety of devices to communicate with each other over a common or universal protocol. In general, a client device and a server device communicate with each other over a communications link utilizes the common protocol. Initially, once a communications link is established, the server device identifies itself to the client device by sending a tag line message over the communications link. Upon receiving the tag line message, the client then determines that the server is capable of using the common protocol. The client device may then initiate several requests including a service request, a type request or a use request. If the client device initiates a service request, the client simple uses the common protocol to request the service. In response to receiving the service request, the server device performs the requested service and provides a confirmation to the client device. If the client device initiates a type request, the service device will respond by providing information regarding the services the server device provides and the device types supported by the server device. If the client device initiates a use request for a particular service, the server device will provide information to the client device that describes the necessary parameters for invoking the particular service.

22 Claims, 7 Drawing Sheets

UNIVERSAL PROTOCOL FOR ENABLING A DEVICE TO DISCOVER AND UTILIZE THE SERVICES OF ANOTHER DEVICE

RELATED APPLICATIONS

This application claims the benefit of U.S. Provisional Application No. 60/115,106, filed Jan. 8, 1999 and is related to U.S. Application Ser. No. 09/369,114, entitled "Hidden Agent Transport Protocol," still pending filed on Aug. 5, 1999.

TECHNICAL FIELD

This invention relates to the field of data transfer protocols and, more particularly, relates to simple data transfer protocols capable of being used to facilitate communication between a wide variety of consumer devices.

BACKGROUND

Data transfer protocols are used to facilitate communication between electronic devices by providing a common set of rules by which data may be exchanged between one device and another. A universal protocol could theoretically allow one device to communicate with any other device, from simple devices like the lights in a room to complex devices like personal computers. However, to approach such an ideal, the protocol itself has to be usable with at least a significant proportion of the devices. Different types of devices have different characteristics such as microprocessor abilities, free memory, and accompanying costs. In addition, consumer devices are produced by a wide variety of manufacturers. Coordination and cooperation in interfacing a wide variety of electronic devices is very difficult. Thus, the need exists for a universal protocol that may be implemented by a large variety of device types produced by various manufacturers.

Many times in the past, manufacturers have made attempts to allow consumer level devices to be able to communicate meaningful data or commands to one another. Many protocols define data links between standard small devices. However, this also meant that usually the "standard" became only a standard for that genre of device. Further, while these protocols provide a data link, they do not provide a standard method to allow simple relevant information transfer between two small devices. For example, a typical pager cannot send control information to any particular cellular telephone requesting the cellular telephone to initiate a call to a certain number; a "caller-ID" box is not able to instruct a PDA to display all the contact information for the person who is calling; and a PDA cannot print or fax (without a modem or special drivers). Thus, a need exists for a universal protocol which can provide a simple data link between a wide variety of devices.

SUMMARY

The present invention includes a protocol and a method for facilitating communication between various electronic devices and the sharing of features, functionality and information between these devices. In general, the present invention is directed towards a protocol by which one device (the "client device") can discover what services are offered by another device (the "server device"). Utilizing this protocol, the client device can take advantage of the services of the server device. Advantageously, the present invention is simple enough to be used by nearly any type of electronic device, but at the same time it is robust enough to allow a user to author high-level applications utilizing multiple different services available from multiple devices without requiring the user to have any knowledge of any particular device interface or how the device works. The present invention is capable of use by a wide range of devices including, but not limited to, pagers, cellular telephones, wired telephones, caller-ID ("CID") boxes, printers, facsimile machines, personal data assistant ("PDA"), personal computers, information sources, time pieces, stereo equipment, video equipment, thermostats, weather stations, doors, lights, and security systems. The present invention allows these devices to interact, by standardizing many of the normal tasks associated with these devices. Convergence Corporation, the assignee of the present invention, has developed a universal protocol, referred to as the Service Discovery Transport Protocol ("SDTP"), which embodies many of the aspects of this invention. Thus, embodiments of the present invention include a universal protocol that can be implement in a wide variety of device types produced by various manufacturers. In addition, embodiments of the present invention provide a simple data link between these devices.

The operation of a protocol implementing aspects of the present invention actually begins when the server device sends a message to the client device to inform the client device that it is capable of communicating using the protocol. In an exemplary embodiment, this message and all subsequent messages may be sent using standard 8-bit ASCII characters. Once the client device determines that the server device is capable of communicating using the protocol, the client device may request the server device to identify what kinds of services the server provides. This request is performed by transmitting a type-command to the server device.

Upon receiving the type-command, the server device responds by transmitting one or more device/service identifiers back to the client device. Each device/service identifier is unique, and represents either a specific device type, such as a thermostat, a door, a pager, a PDA or many others, or a specific service type, such as the ability to raise the temperature of the thermostat or to transmit the messages stored in the pager. Finally, the server device transmits a standard ASCII sequence to signal the last of the device/service identifiers.

After the server device identifies itself as being capable of using the protocol, the client device may issue commands to the server device using the unique service identifiers just described. Any necessary parameters may be passed along as well. If everything operates correctly, the service identified by the command is then provided by the server device. Finally, the server device responds to each such command by sending a status code back to the client device. The status code denotes that either: (a) the requested service was unavailable; (b) the server device was unable to complete the operation; (c) the command contained a syntax error; or (d) that the operation completed successfully.

The protocol also supports "learning" new services with which the client is not previously familiar. To invoke this capability, the client device transmits a use-command to the server device to identify the service that the client wishes to learn. Upon receiving the use-command, the server device transmits a service identifier corresponding to the new service and any available parameters. The client device may then invoke the service by sending the service identifier and the requisite parameters.

Another feature of the present invention is the ability to drop into a different, proprietary protocol. By issuing the native-command, the client device can instruct the server device to utilize the existing link to communicate in whatever proprietary protocol is utilized for that link.

Thus, the present invention includes at least four aspects. One aspect of the present invention is a protocol that allows a client device to request a server device to identify what services are provided by the server device and then allows the client device to request one or more of those services to be provided.

Another aspect of the present invention involves the ability of a client device to determine whether any of a wide variety of server devices are capable of communicating with the client device using a standard protocol and then commanding a particular device to carry out a particular function.

A third aspect of the present invention is the structure of the data packets that are transmitted by a server device to uniquely identify the device types emulated by the server device and the services the server device is capable of performing.

A fourth aspect of the invention involves the ability of a client device to determine whether a particular server device is capable of communicating using the SDTP protocol by first establishing communication using any appropriate technology and then determining if further communication is possible using SDTP.

Therefore, it can be seen that these aspects of the present invention may be utilized within a protocol, operable within a variety of device types, that facilitates communication between the variety of device types over a simple data link. These and other aspects, features, and advantages of the present invention will be set forth in the description that follows and possible embodiments thereof, and by reference to the appended drawings and claims.

DETAILED DESCRIPTION

Figure 1:
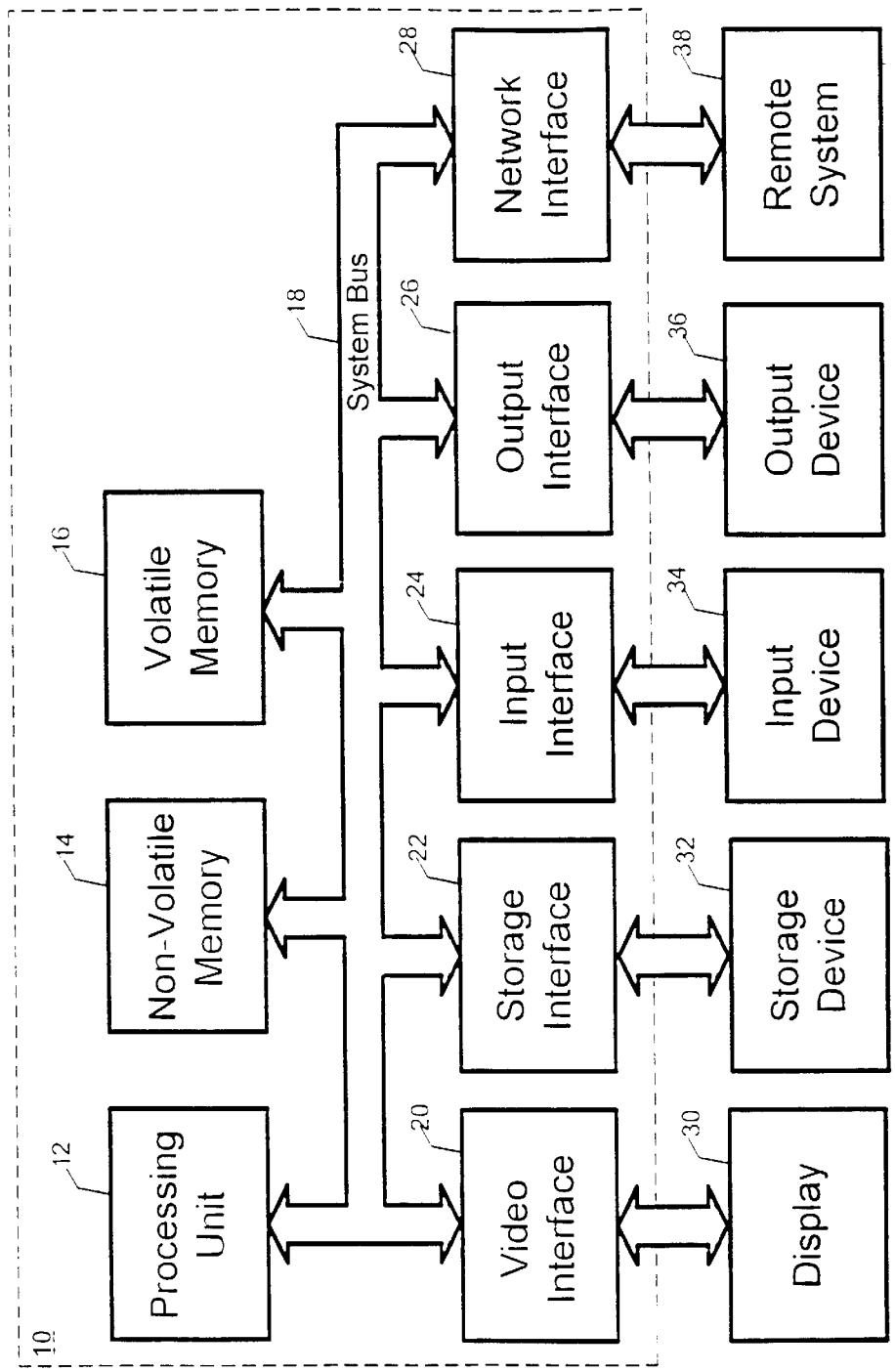
FIG. 1 is a system diagram that illustrates an exemplary environment suitable for implementing various embodiments of the present invention.

Before describing the details of the current invention, some terminology used herein is described. The term "protocol" generally refers to a set of formal rules or conventions describing how data is treated in an electronic system. In electronic communications, protocols define the electrical and physical standards to be observed, such as bit-ordering and byte-ordering and the transmission and error detection and correction of the bit messages, the client-server dialog, character sets, and sequencing of messages. Link protocols define the basics of how communication is established and maintained between two devices. Data protocols define how meaningful data is exchanged between the two devices using the link protocol as the underlying communication layer. Unless otherwise indicated, the term "protocol," as used below, refers to the data protocol employed by a given connection between two devices to communicate meaningful data, such as the discovery of information about one device and the issuance of commands by one device to the other.

Referring now to the drawings, in which like numerals represent like elements throughout the several figures, aspects of the present invention and exemplary operating environments will be described.

FIG. 1 is a system diagram that illustrates an exemplary environment suitable for implementing various embodiments of the present invention. FIG. 1 and the following discussion provide a general overview of a platform onto which the invention may be integrated or implemented. Although in the context of the exemplary environment the invention will be described as consisting of instructions within a software program being executed by a processing unit, those skilled in the art will understand that portions of the invention, or the entire invention itself, may also be implemented by using hardware components, state machines, or a combination of any of these techniques. In addition, a software program implementing an embodiment of the invention may run as a stand-alone program or as a software module, routine, or function call, operating in conjunction with an operating system, another program, system call, interrupt routine, library routine, or the like. The term program module will be used to refer to software programs, routines, functions, macros, data, data structures, or any set of machine readable instructions or object code, or software instructions that can be compiled into such, and executed by a processing unit.

Those skilled in the art will appreciate that the system illustrated in FIG. 1 may take on many forms and may be directed towards performing a variety of functions. Examples of such forms and functions include mainframe computers, mini computers, servers, work stations, personal computers, hand-held devices such a personal data assistants and calculators, consumer electronics, note-book computers, lap-top computers, and a variety of other applications, each of which may serve as an exemplary environment for embodiments of the present invention. The invention may also be practiced in a distributed computing environment where tasks are performed by remote processing devices that are linked through a communications network. In a distributed computing environment, program modules may be located in both local and remote memory storage devices.

The exemplary system illustrated in FIG. 1 includes a computing device 10 that is made up of various components including, but not limited to, a processing unit 12, non-volatile memory 14, volatile memory 16, and a system bus 18 that couples the non-volatile memory 14 and volatile memory 16 to the processing unit 12. The non-volatile memory 14 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), and battery backed random access memory (RAM). The non-volatile memory 14 provides storage for power on and reset routines (bootstrap routines)

that are invoked upon applying power or resetting the computing device 10. In some configurations the non-volatile memory 14 provides the basic input/output system (BIOS) routines that are utilized to perform the transfer of information between the various components of the computing device 10.

The volatile memory 16 may include a variety of memory types and devices including, but not limited to, random access memory (RAM), dynamic random access memory (DRAM), FLASH memory, EEROM, bubble memory, registers, or the like. The volatile memory 16 provides temporary storage for program modules or data that are being or may be executed by, or are being accessed or modified by the processing unit 12. In general, the distinction between non-volatile memory 14 and volatile memory 16 is that when power is removed from the computing device 10 and then reapplied, the contents of the non-volatile memory 14 is not lost, whereas the contents of the volatile memory 16 is lost, corrupted, or erased.

The computing device 10 may access one or more external display devices 30 such as a CRT monitor, LCD panel, LED panel, electro-luminescent panel, or other display device, for the purpose of providing information or computing results to a user. The processing unit 12 interfaces to each display device 30 through a video interface 20 coupled to the processing unit over system bus 18.

The computing device 10 may have access to one or more external storage devices 32 such as a hard disk drive, a magnetic disk drive for the purpose of reading from or writing to a removable disk, and an optical disk drive for the purpose of reading a CD-ROM disk or to read from or write to other optical media, as well as devices for reading from and or writing to other media types including but not limited to, FLASH memory cards, Bernoulli drives, magnetic cassettes, magnetic tapes, or the like. The processing unit 12 interfaces to each storage device 32 through a storage interface 22 coupled to the processing unit 12 over system bus 18. The storage devices 32 provide non-volatile storage for the computing device 10.

The computing device 10 may receive input or commands from one or more input devices 34 such as a keyboard, pointing device, mouse, modem, RF or infrared receiver, microphone, joystick, track ball, light pen, game pad, scanner, camera, or the like. The processing unit 12 interfaces to each input device 34 through an input interface 24 coupled to the processing unit 12 over system bus 18. The input interface may include one or more of a variety of interfaces, including but not limited to, an RS-232 serial port interface or other serial port interface, a parallel port interface, a universal serial bus (USB), an optical interface such as infrared or IRDA, an RF or wireless interface such as Bluetooth, or other interface.

The computing device 10 may send output information, in addition to the display 30, to one or more output devices 36 such as a speaker, modem, printer, plotter, facsimile machine, RF or infrared transmitter, or any other of a variety of devices that can be controlled by the computing device 10. The processing unit 12 interfaces to each output device 36 through an output interface 26 coupled to the processing unit 12 over system bus 18. The output interface may include one or more of a variety of interfaces, including but not limited to, an RS-232 serial port interface or other serial port interface, a parallel port interface, a universal serial bus (USB), an optical interface such as infrared or IRDA, an RF or wireless interface such as Bluetooth, or other interface.

The computing device 10 may operate in a networked environment using logical connections to one or more remote systems, such as a remote computer 38. The remote computer 38 may be a server, a router, a peer device or other common network node, and typically includes many or all of the components described relative to the computing device 10. When used in a networking environment, the computing device 10 is connected to the remote system 38 over a network interface 28. The connection between the remote computer 38 and the network interface 28 depicted in FIG. 1 may include a local area network (LAN), a wide area network (WAN), a telephone connection, or the like. These types of networking environments are commonplace in offices, enterprise-wide computer networks, intranets and the Internet.

It will be appreciated that program modules implementing various embodiments of the present invention may be stored in the storage device 32, the non-volatile memory 14, the volatile memory 16, or in a networked environment, in a remote memory storage device of the remote system 38. The program modules may include an operating system, application programs, other program modules, and program data. The processing unit 12 may access various portions of the program modules in response to the various instructions contained therein, as well as under the direction of events occurring or being received over the input interface 24 and the network interface 28.

Figure 2:
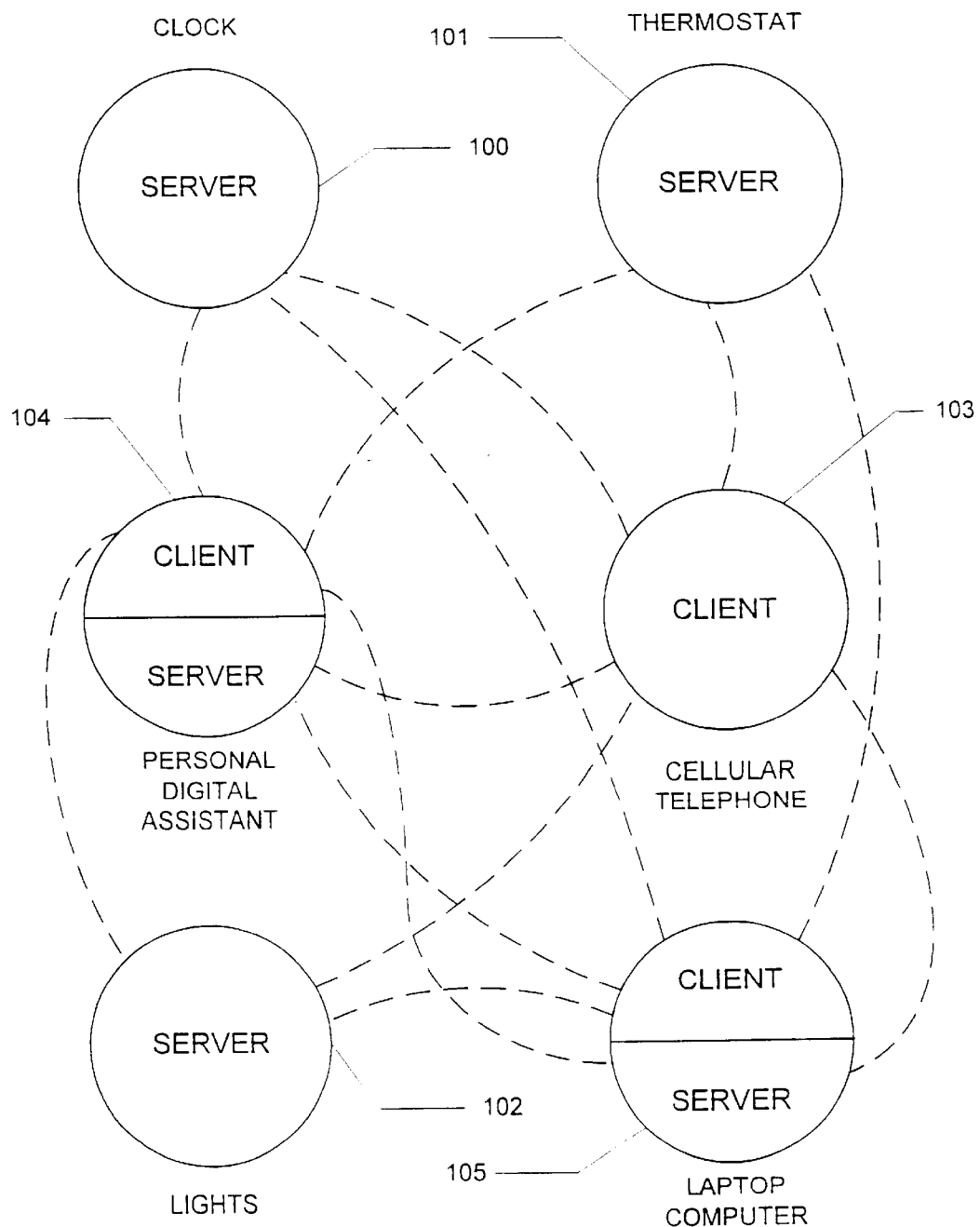
FIG. 2 illustrates an exemplary environment in which the protocol of the present invention operates.

FIG. 2 illustrates an exemplary environment in which the protocol of the present invention operates. As shown, the environment comprises a plurality of devices 200–205, represented by circles. As used herein, "devices" include server devices 200–202, client devices 203, and client/server devices 204–205. The server devices 200–202 are capable of providing one or more services or carrying out one or more functions. The client devices 203 are capable of instructing the server devices 202 to carry out a designated function or service via a communications link represented by a broken line in FIG. 2. A service could be an external operation, such as adjusting the temperature of a thermostat or switching the lights in a room on or off, or it might involve additional communication between the server device and the client device, such as sending a telephone number from a PDA to a laptop computer. However, a client device is only capable of communicating a service request to a server device if the client device and the server device are capable of communicating using a common protocol. Unfortunately, in today's environment, common protocols are usually shared only by devices produced by the same manufacturer, or by using such devices as modems or special drivers.

As illustrated in FIG. 2, a particular device 200–205 may be both a server device and a client device such as client/server devices 204–205. The client/server devices 204–205 may be capable of instructing other server devices to carry out a designated function while, at the same time, may carry out a function itself. For example, in its client role, a laptop computer might need to retrieve data from a PDA carried by a user, and then in its server role, the laptop might be called on by the user to provide a telephone number directly to a cellular telephone. Thus, the laptop functions as both a client device and a server device. However, in the following description, each device will be discussed only in its role as either a client device or a server device.

Figure 3:
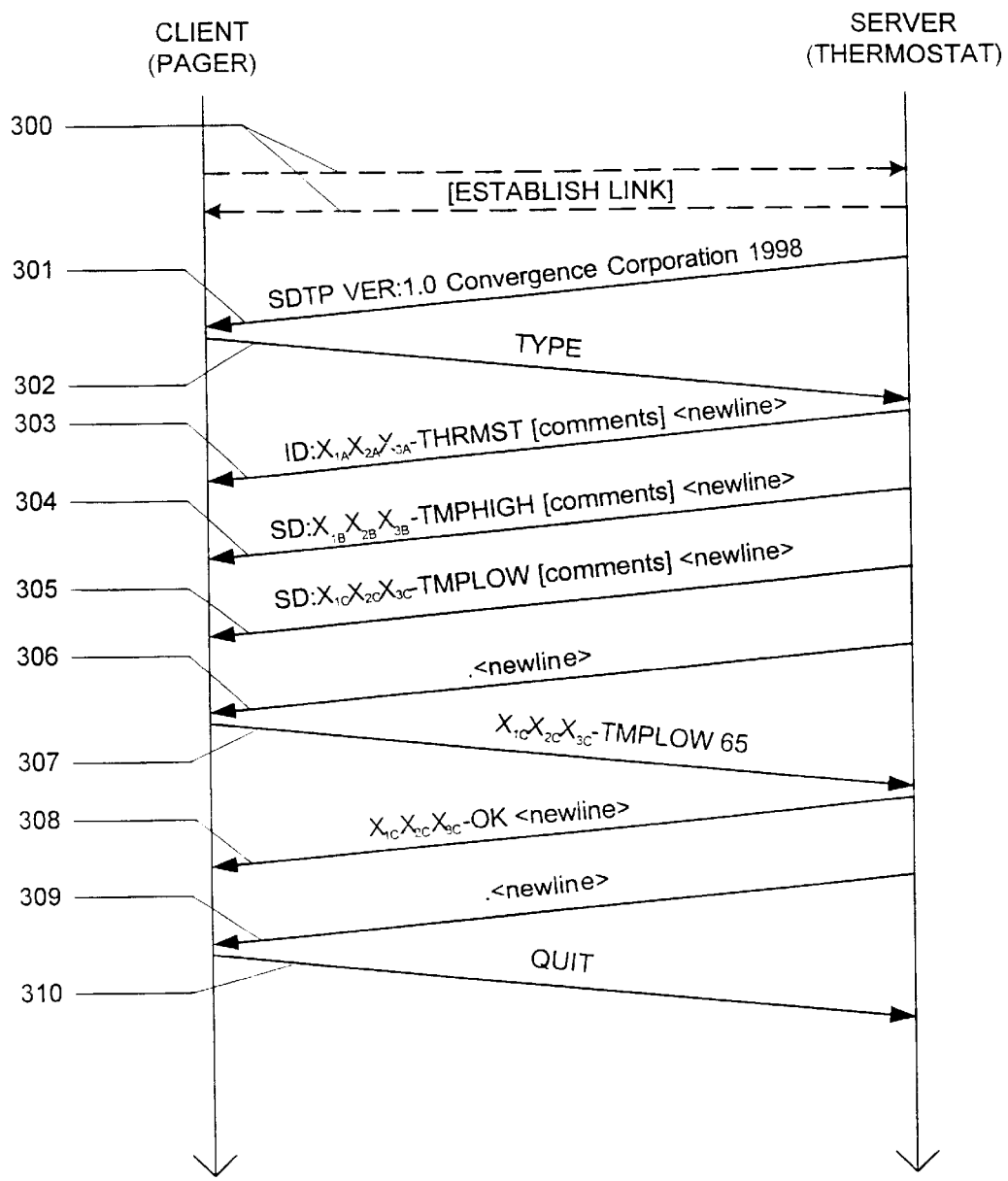
FIG. 3 is an exemplary sequential diagram showing the basic steps of the protocol of the present invention.

FIG. 3 is an exemplary sequential diagram showing the basic steps of the protocol of the present invention. It is important to note that this diagram is meant to depict only the basic functionality of the protocol, and that actual use of the protocol will commonly involve a greater or lesser number of steps. Further, it is important to note that the steps shown and described do not all have to take place in the sequence shown. The sequence represents only a typical use of the available protocol functions which may or may not be followed in actual use.

As shown in FIG. 3, use of the protocol of the present invention does not begin until communication between a client device and a server device is already established at Step 300 using a link protocol, also referred to as a link layer. The protocol of the present invention does not require the use of a specific link layer, but in an exemplary embodiment, the protocol may impose certain requirements such as: 1) allowing for serial ASCII data transfer; and 2) if binary data is to be sent, using standard UUEncode/UUDecode routines to provide the proper conversions to and from ASCII data. Existing link layers which meet these requirements include, but are not limited to, serial cable, IrDA, Bluetooth and TCP/IP sockets.

If a device provides a service, it must be running a protocol server. Once a connection 300 using the link layer is complete, the server will identify itself as being capable of communicating using the protocol of the present invention by issuing a tag line message 301. The issuance of the tag line message 301 signals the actual start of the operation of the protocol of the present invention. In an exemplary embodiment, the tag line message 301 and all subsequent messages are sent using standard 8-bit ASCII characters. In the illustrated embodiment, the tag line message 301 is in the following format:

PROTOCOLNAME VER:N.N [COMMENTS].

where PROTOCOLNAME is the name of the protocol, N.N is the current version of that protocol, and COMMENTS is an optional field which can be used to describe the manufacturer, the date of manufacture, or the like. As previously mentioned, Convergence Corporation has developed a universal protocol, called Service Discovery Transport Protocol ("SDTP") which embodies many of the aspects of this invention. Thus, in the example shown in FIG. 3, the SDTP-enabled server transmits the following tag line message:

SDTP VER:1.0 Convergence Corporation 1998.

Further description of the protocol of the present invention will focus on this specific, exemplary embodiment, but it should be understood that the present invention is not limited to the specifics of the SDTP protocol.

Once the server device issues the tag line message 301, the client device may request the server device to identify the device types it supports and the services the server device provides. This request is performed by transmitting a type-command 302 to the server device. The type-command could be implemented in a variety of forms, but in the illustrated embodiment, the type-command 302 comprises the word "TYPE." Although it is common for the client device to send the type-command 302, it should be understood that sending the type-command is not a required step. For example, a client device may already be aware that a particular service is available from the server device. Advantageously, this may save time in the communication process.

If the server device receives the type-command 302, the server device transmits to the client device a data packet 303–306 describing the devices and services provided by the server device. The data packet 303–306 contains several data fields. Among the data fields are one or more device/service identifiers 303–305, each of which represents either a specific device type or a specific service type. For example a device type may include a thermostat, a door, a pager, a PDA or the like. A service type may include the ability to raise the temperature of a thermostat or to transmit the messages stored in a pager. Although the device/service identifier may be implemented in a variety of forms, in the illustrated embodiment, the device/service identifier subsists in the following form:

$x_1 x_2 x_3$-NAME where NAME is a short (7 characters or less) description of the device or the service, and $x_1 x_2 x_3$ is a unique three character "identifier." Each of the three characters of the three character identifier is chosen from an alphabet consisting of the characters:

[0 . . . 9], [a . . . z], and [A . . . Z].

In addition, the $x_1$, $x_2$ and $X_3$ characters are chosen such that $$(x_1 \cdot x_2) + x_3$$

forms a unique value. This technique allows for 12161 unique device/services to be used under SDTP while at the same time only requiring 16-bit math to be used when describing a device or a service.

A SDTP server must be able to provide the functionality of at least one device to be classified as a SDTP server. Thus, the data packet 303–306 sent by the server device must include at least one device identifier 303. In the example shown in FIG. 3, the device identifier is $X_{1A}X_{2A}X_{3A}$-THRMST. In addition, because most server devices support a variety of services, the device identifier 303 is usually followed by multiple service identifiers 304–305. In the example shown in FIG. 3, the service identifiers are $X_{1B}X_{2B}X_{3B}$-TMPHIGH 304 and $X_{1C}X_{2C}X_{3C}$-TMPLOW 305. In addition, multiple device identifiers (not shown) may be sent if the server supports multiple device types. For example, a cellular telephone that may also function as a pager would send a device identifier for both the cellular telephone and the pager.

In an exemplary embodiment, each individual device/service identifier 303–305 is sent as a single line of data and is limited to a maximum of 64 characters in length. Advantageously, this technique allows devices having a limited amount of RAM to receive and process a full line of data without facing an overflow condition. The end of a line of data is signaled by transmitting the ASCII <newline> character. Upon transmission of the final data packet 303–306 by the server device, the end of the response is signaled by transmitting an end of response message 306. In an exemplary embodiment, an end of response message 306 includes the ASCII characters "." and "<newline>". Thus, the basic structure of a server device data packet sent in response to a type-command would be as follows:

---

ID:DEVICEID[COMMON NAME][COMMENTS]<newline>
SD:[SERVICEID1][SD_COMMENTS1]<newline>
SD:[SERVICEID2][SD_COMMENTS2]<newline>

.<newline>

--- where:
DEVICEID uniquely identifies a particular type of device,
COMMON NAME uniquely identifies a particular device of the type DEVICEID,
COMMENTS contains additional meaningful information about the device,
SERVICEID1 and SERVICEID2 uniquely identify particular services, and
SD_COMMENTS1 and SD_COMMENTS2 contain meaningful information about the services SERVICEID1 and SERVICEID2, respectively.

In an exemplary embodiment, the COMMON NAME field is no more than 16 characters in length to minimize device memory requirements. Additionally, in an exemplary embodiment the COMMON NAME field is user customizable at the SDTP server level. This field is utilized by the user of a client device to recognize which particular device of the type "DEVICEID" is involved. Examples of suitable names of devices include "BobsPager," "JeffsPDA," and "CommonPrinter."

The contents and the use of the various comments fields are completely optional. For example, COMMENTS may include information such as "Laser printer on 4th floor." Similarly, if the server device is a pager and the first service provided is the transmission to the client device of page information which has been stored in the pager, SD_COMMENTS1 might be "Page Information."

To illustrate the use and meaning of the DEVICEID and SERVICEID data fields and their relationship with the operation of the protocol of the present invention, an exemplary server device will next be discussed. Referring again to FIG. 1, one device operable in accordance with the protocol of the present invention is a pager unit. The pager includes a processing unit, a memory, and a bus that couples the memory to the processing unit. The pager is capable of receiving pages via wireless signal transmission and storing page information in the memory. A user may enter commands and information into the pager through the use of a keypad. A LED or LCD display may be used to display page information when received or when retrieved from memory. A speaker is provided to indicate the reception of a page. In addition to being able to receive pages via traditional wireless signal transmission, a pager that includes an embodiment of the present invention is also able to communicate directly with other devices. The pager carries out this communication using one or more communications means selected from a wide variety of communications technologies. The communication means may be utilized by the pager to transmit to another device and to receive information from another device. Although current pagers may or may not be equipped with the appropriate communications means necessary for complete implementation of the protocol of the present invention, it should be understood that suitable communications technologies currently exist and that the selection and implementation of one or more of these technologies would be obvious to one of ordinary skill in the art.

According to an exemplary method of operation of the protocol of the present invention, the pager carries a unique device identifier (DEVICEID) such as $x_1x_2x_3$-1WAYPGR, where $x_1x_2x_3$ is selected according to the previously-described criteria for uniqueness. Services provided by the pager may include a status check, a transmission of the last page received by the pager, a transmission of a specified page previously received by the pager, a transmission of a list of identifiers for pages currently stored in the pager's storage means, a transmission of a current clock reading and/or an update of the clock. Each service carries a unique service identifier in the form $x_1x_2x_3$-NAME, as previously described. Thus, the pager may carry the services with service identifiers (SERVICEID's) $x_1x_2x_3$-STAT, $x_1x_2x_3$-PAGERX, $x_1x_2x_3$-PAGE, $x_1x_2x_3$-LIST, $x_1x_2x_3$-TIME and/or $x_1x_2x_3$-TIMESET, corresponding respectively with the above-identified services.

A common one-way pager that supports page reception, time reporting, and time setting, might respond to a type-command with the following data packet:

ID:$X_{4A}X_{4B}X_{4C}$-1 WAYPGR<newline>
SD:$X_{5A}X_{5B}X_{5C}$-PAGERX<newline>
SD:$X_{6A}X_{6B}X_{6C}$-TIME<newline>
SD:$X_{7A}X_{7B}X_{7C}$-TIMESET<newline>
.<newline> where "$X_{4A}X_{4B}X_{4C}$" "$X_{5A}X_{5B}X_{5C}$" "$X_{6A}X_{6B}X_{6C}$" and "$X_{7A}X_{7B}X_{7C}$" are examples of possible unique device and server identifiers (DEVICEID and SERVICEID's, respectively).

As mentioned previously, other exemplary embodiments of server devices capable of using the protocol of the present invention include, without limitation, a two-way pager, a voice pager, a cellular telephone, a PDA, a personal computer, a wired telephone, a CID box, a printer, a fax machine, a clock, audio equipment, video equipment, a thermostat, an email device, a security system, and a generic information device. These devices and a non-exclusive list of services that might be offered by these devices are listed in Table 1, along with exemplary unique ids for the devices or services.

TABLE 1

| Device | Device ID | Service | Service ID |
|---|---|---|---|
| One-way pager | $x_1x_2x_3$-1 WAYPGR | Status of the pager | $x_1x_2x_3$-STAT |
|  |  | Last page received | $x_1x_2x_3$-PAGERX |
|  |  | Displays a page from a LIST command | $x_1x_2x_3$-PAGE |
|  |  | Register | $x_1x_2x_3$-REGSTR |
|  |  | List pages | $x_1x_2x_3$-LIST |
|  |  | Return the current time/date | $x_1x_2x_3$-TIME |
|  |  | Set the time | $x_1x_2x_3$-TIMESET |
| Two-way pager | $x_1x_2x_3$-2WAYPGR | Status of the pager | $x_1x_2x_3$-STAT |
|  |  | Last page received | $x_1x_2x_3$-PAGERX |
|  |  | Displays a page from a LIST command | $x_1x_2x_3$-PAGE |
|  |  | Transmits a page | $x_1x_2x_3$-PAGETX |
|  |  | Register | $x_1x_2x_3$-REGSTR |
|  |  | List pages | $x_1x_2x_3$-LIST |
|  |  | Return the current time/date | $x_1x_2x_3$-TIME |
|  |  | Set the time | $x_1x_2x_3$-TIMESET |
| Voice pager | $x_1x_2x_3$-VOCPGER | Status of the pager | $x_1x_2x_3$-STAT |
|  |  | Last page received is played | $x_1x_2x_3$-PAGERX |
|  |  | Play a page from a LIST command | $x_1x_2x_3$-PLYPAGE |
|  |  | Register | $x_1x_2x_3$-REGSTR |
|  |  | List pages | $x_1x_2x_3$-LIST |
|  |  | Return the current time/date | $x_1x_2x_3$-TIME |
|  |  | Set the time | $x_1x_2x_3$-TIMESET |
| Cellular phone | $x_1x_2x_3$-CELLULR | Status of the phone | $x_1x_2x_3$-STAT |
|  |  | Dials a phone number (or instructs to dial) | $x_1x_2x_3$-DIAL |
|  |  | Register | $x_1x_2x_3$-REGSTR |
|  |  | List numbers in the phone's number list | $x_1x_2x_3$-LISTNUM |
|  |  | Add a phone number to the list | $x_1x_2x_3$-ADDLIST |
|  |  | Clears a list entry | $x_1x_2x_3$-CLRLIST |
|  |  | Return the current time/date | $x_1x_2x_3$-TIME |
|  |  | Set the time | $x_1x_2x_3$-TIMESET |
| Personal Data Assistant | $x_1x_2x_3$-PDA | PDA status | $x_1x_2x_3$-STAT |
|  |  | Specifies a new calendar event | $x_1x_2x_3$-CALEVT |
|  |  | Lists upcoming calendar events | $x_1x_2x_3$-LISTCAL |
|  |  | Lists contacts | $x_1x_2x_3$-LISTCON |
|  |  | Adds a new contact | $x_1x_2x_3$-NEWCON |
|  |  | Search for a contact | $x_1x_2x_3$-SEARCH |
|  |  | Return the current time/date | $x_1x_2x_3$-TIME |
|  |  | Set the time | $x_1x_2x_3$-TIMESET |

TABLE 1-continued

| Device | Device ID | Service | Service ID |
|---|---|---|---|
| Personal Computer | $x_1x_2x_3$-PC | PC status | $x_1x_2x_3$-STAT |
| | | Specifies a new calendar event | $x_1x_2x_3$-CALEVT |
| | | Lists upcoming calendar events | $x_1x_2x_3$-LISTCAL |
| | | Lists contacts | $x_1x_2x_3$-LISTCON |
| | | Adds a new contact | $x_1x_2x_3$-NEWCON |
| | | Search for a contact | $x_1x_2x_3$-SEARCH |
| | | Transmits a file | $x_1x_2x_3$-FILETX |
| | | Receives a file | $x_1x_2x_3$-FILERX |
| | | Return the current time/date | $x_1x_2x_3$-TIME |
| | | Set the time | $x_1x_2x_3$-TIMESET |
| Wired Telephone | $x_1x_2x_3$-TELEPH | Phone status | $x_1x_2x_3$-STAT |
| | | Dials a phone number | $x_1x_2x_3$-DIAL |
| | | Register | $x_1x_2x_3$-REGSTR |
| | | Lists the phones number list | $x_1x_2x_3$-LISTNUM |
| | | Adds to the phones number list | $x_1x_2x_3$-ADDLIST |
| | | Clears an entry in the phones list | $x_1x_2x_3$-CLRLIST |
| | | Return the current time/date | $x_1x_2x_3$-TIME |
| | | Set the time | $x_1x_2x_3$-TIMESET |
| CID box | $x_1x_2x_3$-CID | Caller ID status | $x_1x_2x_3$-STAT |
| | | Register | $x_1x_2x_3$-REGSTR |
| | | List all caller ID's | $x_1x_2x_3$-LISTNUM |
| | | Last call received | $x_1x_2x_3$-LATEST |
| | | Attempt to identify a phone number | $x_1x_2x_3$-CALLID |
| | | Return the current time/date | $x_1x_2x_3$-TIME |
| | | Set the time | $x_1x_2x_3$-TIMESET |
| Printer | $x_1x_2x_3$-PRINT | Printer status | $x_1x_2x_3$-STAT |
| | | Print a file | $x_1x_2x_3$-PRINT |
| | | Return the current time/date | $x_1x_2x_3$-TIME |
| | | Set the time | $x_1x_2x_3$-TIMESET |
| Fax machine | $x_1x_2x_3$-FAX | Fax status | $x_1x_2x_3$-STAT |
| | | Dials a phone number | $x_1x_2x_3$-DIAL |
| | | Send a fax | $x_1x_2x_3$-FAX |
| | | Register | $x_1x_2x_3$-REGSTR |
| | | List fax numbers | $x_1x_2x_3$-LISTNUM |
| | | Add to the fax numbers list | $x_1x_2x_3$-ADDLIST |
| | | Clear an entry to the list | $x_1x_2x_3$-CLRLIST |
| | | Return the current time/date | $x_1x_2x_3$-TIME |
| | | Set the time | $x_1x_2x_3$-TIMESET |
| Clock | $x_1x_2x_3$-CLOCK | Clock status | $x_1x_2x_3$-STAT |
| | | Return the current time/date | $x_1x_2x_3$-TIME |
| | | Set the time | $x_1x_2x_3$-TIMESET |
| | | Last alarm | $x_1x_2x_3$-ALARM |
| | | Set an alarm | $x_1x_2x_3$-ALARMSET |
| | | Clear an alarm | $x_1x_2x_3$-ALARMDEL |
| | | Lists alarm | $x_1x_2x_3$-LIST |
| Stereo Equipment | $x_1x_2x_3$-STEREO | Stereo status | $x_1x_2x_3$-STAT |
| | | Current tuned frequency | $x_1x_2x_3$-FREQ |
| | | Set the frequency | $x_1x_2x_3$-FREQSET |
| | | Tune up | $x_1x_2x_3$-FREQUP |
| | | Tune down | $x_1x_2x_3$-FREQDWN |
| | | Volume up | $x_1x_2x_3$-VOLUP |
| | | Volume down | $x_1x_2x_3$-VOLDN |
| | | Volume set | $x_1x_2x_3$-VOLSET |
| | | On | $x_1x_2x_3$-ON |
| | | Off | $x_1x_2x_3$-OFF |
| | | Play media | $x_1x_2x_3$-PLAY |
| | | Change track up | $x_1x_2x_3$-TRKUP |
| | | Change track down | $x_1x_2x_3$-TRKDWN |
| | | Set the track | $x_1x_2x_3$-TRKSET |
| | | Fast forward | $x_1x_2x_3$-FF |
| | | Rewind | $x_1x_2x_3$-REW |
| | | Mute | $x_1x_2x_3$-MUTE |
| | | Stop | $x_1x_2x_3$-STOP |
| | | Pause | $x_1x_2x_3$-PAUSE |
| | | Record | $x_1x_2x_3$-RECORD |
| | | Lists media | $x_1x_2x_3$-LIST |
| | | Return the current time/date | $x_1x_2x_3$-TIME |
| | | Set the time | $x_1x_2x_3$-TIMESET |
| Video Equipment | $x_1x_2x_3$-VIDEO | Status | $x_1x_2x_3$-STAT |
| | | Channel up | $x_1x_2x_3$-CHUP |
| | | Channel down | $x_1x_2x_3$-CHDWN |
| | | Current channel | $x_1x_2x_3$-CHNL |
| | | Set channel | $x_1x_2x_3$-CHNLSET |
| | | Volume up | $x_1x_2x_3$-VOLUP |
| | | Volume down | $x_1x_2x_3$-VOLDN |
| | | Set volume | $x_1x_2x_3$-VOLSET |
| | | On | $x_1x_2x_3$-ON |
| | | Off | $x_1x_2x_3$-OFF |
| | | Switch video media | $x_1x_2x_3$-SWITCH |
| | | Play media | $x_1x_2x_3$-PLAY |
| | | Track up | $x_1x_2x_3$-TRKUP |
| | | Track down | $x_1x_2x_3$-TRKDWN |
| Video Equipment (cont.) | | Set track | $x_1x_2x_3$-TRKSET |
| | | Fast forward | $x_1x_2x_3$-FF |
| | | Rewind | $x_1x_2x_3$-REW |
| | | Mute | $x_1x_2x_3$-MUTE |
| | | Stop | $x_1x_2x_3$-STOP |
| | | Pause | $x_1x_2x_3$-PAUSE |
| | | Record | $x_1x_2x_3$-RECORD |
| | | Lists media | $x_1x_2x_3$-LIST |
| | | Return the current time/date | $x_1x_2x_3$-TIME |
| | | Set the time | $x_1x_2x_3$-TIMESET |
| Thermostat/Thermometer | $x_1x_2x_3$-THERMO | Thermostat status | $x_1x_2x_3$-STAT |
| | | Set the high temperature | $x_1x_2x_3$-TMPHIGH |
| | | Set the low temperature | $x_1x_2x_3$-TMPLOW |
| | | Force AC to be turned on | $x_1x_2x_3$-ONAC |
| | | Force heat to be turned on | $x_1x_2x_3$-ONHEAT |
| | | Force AC to be turned off | $x_1x_2x_3$-OFFAC |
| | | Force heat to be turned off | $x_1x_2x_3$-OFFHEAT |
| | | Force fan to be turned on | $x_1x_2x_3$-ONFAN |
| | | Force fan to be turned off | $x_1x_2x_3$-OFFFAX |
| | | Return the current time/date | $x_1x_2x_3$-TIME |
| | | Set the time | $x_1x_2x_3$-TIMESET |

TABLE 1-continued

| Device | Device ID | Service | Service ID |
|---|---|---|---|
| Generic Information Device | $x_1x_2x_3$-GENERIC | Status of the information device | $x_1x_2x_3$-STAT |
| | | List information identifiers | $x_1x_2x_3$-LIST |
| | | Display info from id | $x_1x_2x_3$-DISPL |
| | | List sub-information | $x_1x_2x_3$-LISTID |
| | | List possible query | $x_1x_2x_3$-LISTQ |
| | | Make query | $x_1x_2x_3$-QUERY |
| | | Return the current time/date | $x_1x_2x_3$-TIME |
| | | Set the time | $x_1x_2x_3$-TIMESET |
| Email device | $x_1x_2x_3$-EMAIL | Status of email device | $x_1x_2x_3$-STAT |
| | | Send email | $x_1x_2x_3$-SEND |
| | | List emails | $x_1x_2x_3$-LIST |
| | | Display emails | $x_1x_2x_3$-EMAIL |
| | | Return the current time/date | $x_1x_2x_3$-TIME |
| | | Set the time | $x_1x_2x_3$-TIMESET |
| Security System | $x_1x_2x_3$-SECURTY | Security system status | $x_1x_2x_3$-STAT |
| | | Turn security system on | $x_1x_2x_3$-ON |
| | | Turn security system off | $x_1x_2x_3$-OFF |
| | | Register | $x_1x_2x_3$-REFSTR |
| | | Return the current time/date | $x_1x_2x_3$-TIME |
| | | Set the time | $x_1x_2x_3$-TIMESET |

Referring again to FIG. 3, at any time after the server device issues the protocol tag line message 301, the client device may command the server device to carry out specific services using the unique service identifiers just described. For example, the client device may issue a service-command 307 $X_{1C}X_{2C}X_{3C}$-TMPLOW 65. However, as shown in FIG. 3, service-commands are typically issued after the client device first determines what services are available by issuing the type-command 302. A service-command 307 may be issued by transmitting either the full device identifier ($x_1x_2x_3$-NAME) or just the unique three letter prefix ($x_1x_2x_3$). Any necessary parameters may be passed along as well. For example, the following command might be used to set a threshold temperature of 65 degrees Fahrenheit at which the thermostat turns on the heat:

$X_{1C}X_{2C}X_{3C}$-TMPLOW 65.

Alternatively, the following simplified command might be used to accomplish the same task:

$X_{1C}X_{2C}X_{3C}$-65

Unless the communication between the client device and the server device using the protocol fails, the server device will provide some sort of status-response to a service-command 307 issued by the client device. As shown in FIG. 3, a successful-completion response 308 is sent to the server device to confirm the completion of the requested task. An exemplary successful-completion response 308 could be formatted as follows:

$x_1x_2x_3$-OK where $x_1x_2x_3$ is the identifier of the requested service. Alternatively, a server device might return other data in addition to or in lieu of the usual successful-completion response 308 described above. For example, upon successfully setting the clock of a server device to a specified time, the device might send a response echoing the time which was set.

Other status responses are sent by the server device to indicate other conditions. For example in an exemplary embodiment, $x_1x_2x_3$-NOSERV could be sent when a requested service is unavailable. As another example, $x_1x_2x_3$-NOTDONE could be sent when a requested service is available, but the server device is unable to successfully complete the requested service. Likewise, $x_1x_2x_3$-SYNTAX could be sent when a service-command contains a syntax error. It should be obvious to one of ordinary skill in the art that other status-responses, in addition to, or in lieu of, the above-described ones, may be used as well and the present invention is not limited to any particular set.

In an exemplary embodiment, the server device signals the end of its status-response by sending the "." and "<newline>" character. The client device ends further client-server communication by transmitting a quit-command 310 to the server device. In an exemplary embodiment, the quit-command may comprise the word "QUIT" or a similar indicator. In response to receiving a quit-command, the server closes the protocol connection using whatever method the server needs to disconnect the client, and the operation of the protocol is complete.

Figure 4:
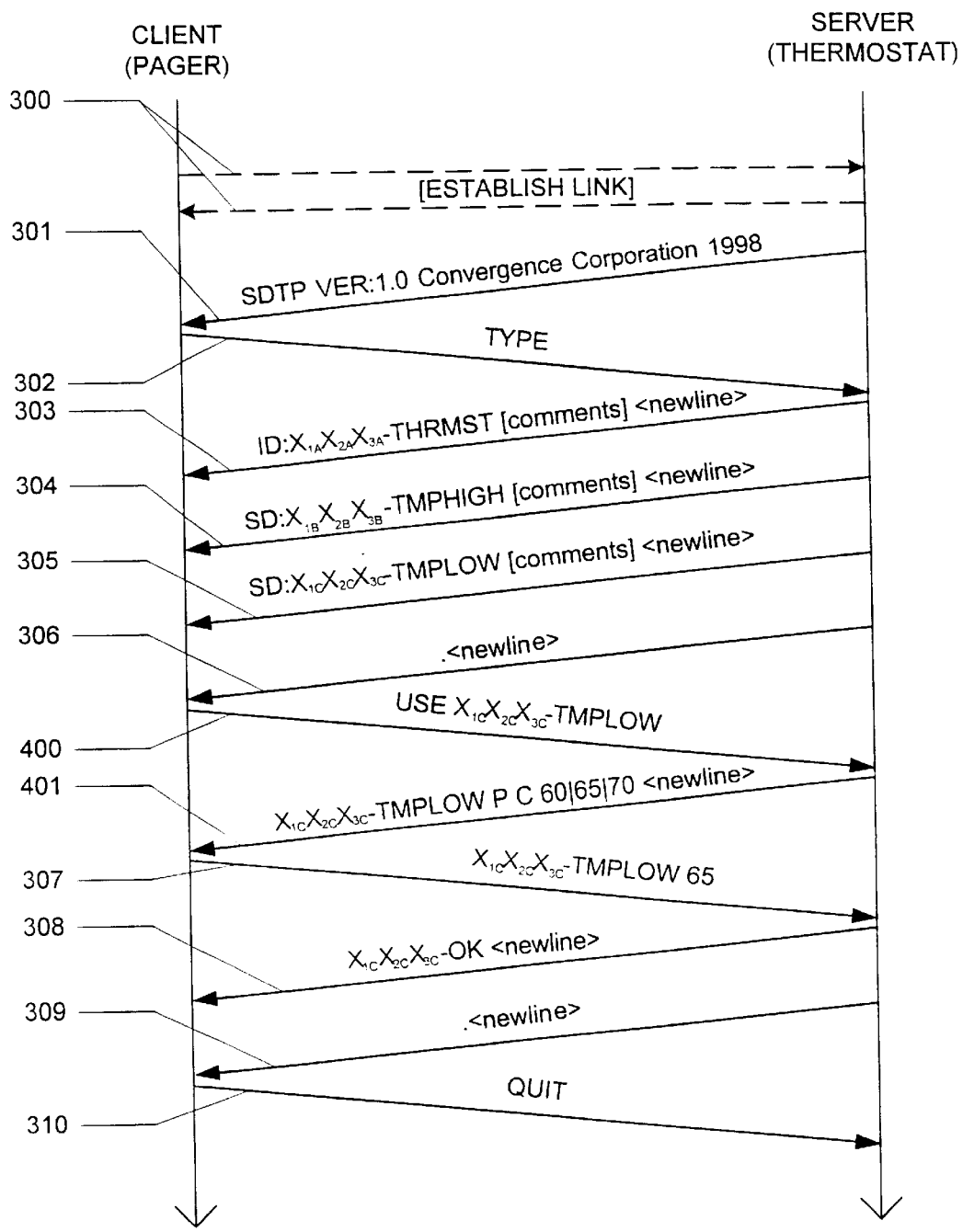
FIG. 4 is an exemplary sequential diagram showing the basic steps of the "learning" capability of the protocol of the present invention.

FIG. 4 is an exemplary sequential diagram showing the operation of the "learning" capability of the protocol of the present invention. As with FIG. 3, it is important to note that the steps shown and described do not all have to take place in the sequence shown, and that the sequence represents only a typical use of the available protocol functions which may or may not be followed in actual use.

The learning capability is invoked by a client device which wishes to know how to use a particular service. In an exemplary embodiment, a client device invokes this process by issuing a use-command. An exemplary format for a use-command is as follows:

USE $x_1x_2x_3$-NAME.

where $x_1x_2x_3$-NAME is the service identifier of a service the client device wishes to learn how to use. As shown in FIG. 4, the use-command 400 may be issued by the client device after it receives a response to a type-command 302; however, the use-command 400 may also be issued without first issuing and receiving a response to a type-command.

In response to receiving a use-command 400, the server transmits a use-response 401 to the client device explaining how the identified service is used. In an exemplary embodiment, the server device's use-response 401 to the use-command 400 is in the following format:

$x_1x_2x_3$-NAME P[PARAMTYPE] P[PARAMTYPE] . . . D[DESCRIPTION]

where PARAMTYPE is the type of the parameters the service command requires. The description is a short description of the parameters. The parameters may include, but are not limited to, a generic string of characters, a set of pre-defined options ("choices") from which the client device may choose when invoking the service such as a time, a boolean "yes or no" option, an ID, or the like. Table 2 is a non-exhaustive list of parameters and their descriptions that might be included in the server device's use-response.

TABLE 2

| PARAMTYPE | DESCRIPTION |
|---|---|
| S | String generic string input |
| C<CHOICE1\|CHOICE2\|. . .> | Choice - Where the client selects from a set of Choices described by <CHOICE1\|CHOICE2\|etc> |
| T | Time |
| B<FLAG1\|FLAG2> | Boolean - Client can select from either FLAG1 or FLAG2 |
| I | ID - Used in SDTP list ID's when a service lists ID's that are unique for this session only to identify an item from a LIST. |

Figure 5:
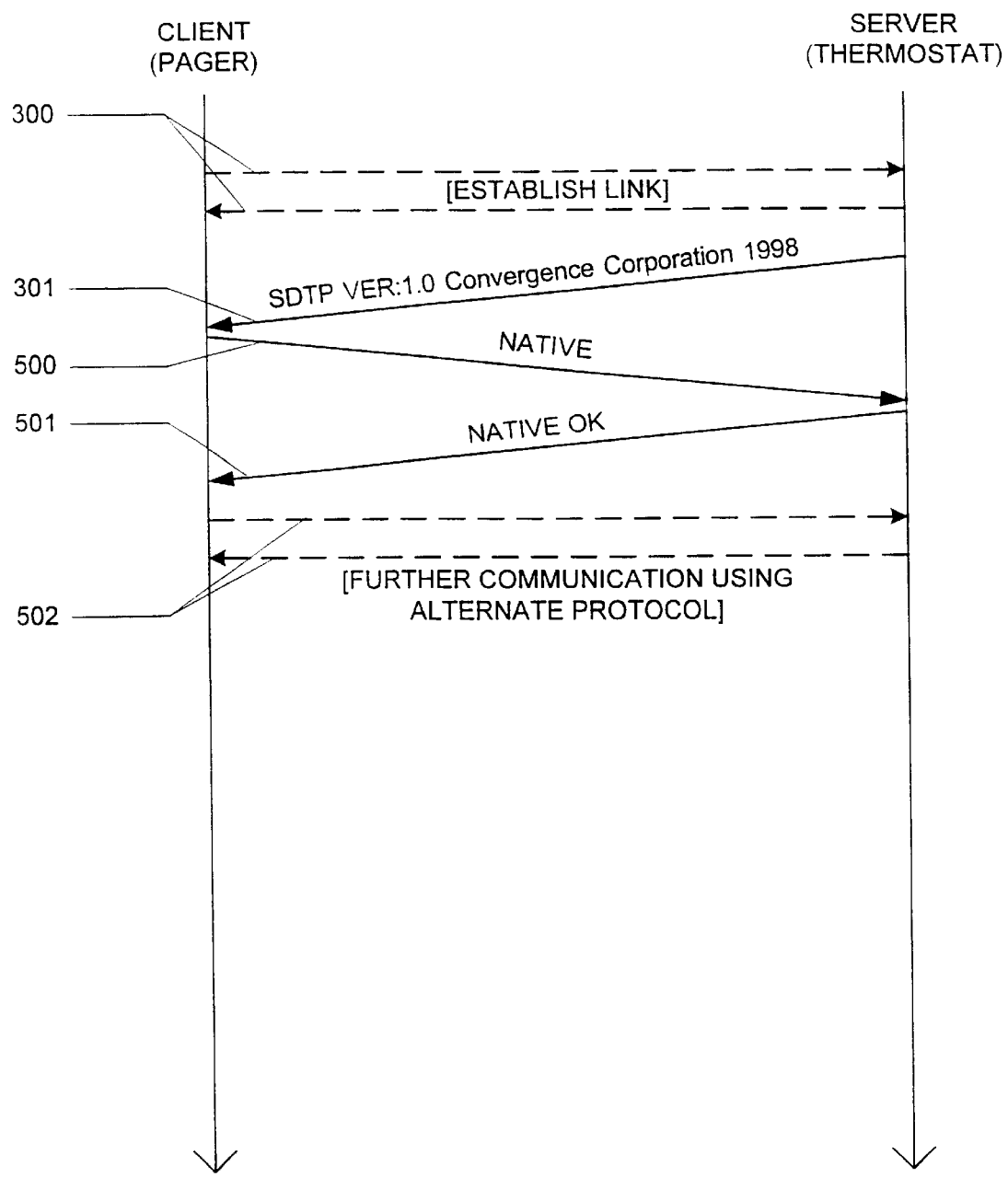
FIG. 5 is an exemplary sequential diagram showing how communication between a client device and a server device may be, switched from using the protocol of the present invention to a native, proprietary protocol.

FIG. 5 is an exemplary sequential diagram showing how communication between a client device and a server device may be switched from using the protocol of the present invention to a native, proprietary protocol. As with FIG. 3, it is important to note that the steps shown represent only a typical use of the available protocol functions which may or may not be followed in actual use.

The "native" capability is generally controlled by the client device. When the client device using the SDTP protocol wishes to use the underlying communications link for another data protocol instead, the client device may send the native-command 500 to the server device. In an exemplary embodiment, the native-command comprises the word "NATIVE." As shown in FIG. 5, the native-command may be issued at any time after the server device issues the tag line message 301. Upon receiving the native-command, the server may respond by sending a native-response 501. In an exemplary embodiment, the native-response corresponding to the native-command 500 may be formatted as follows:

NATIVE OK<newline>.

In addition, the server will switch control over to the native protocol used for this link. Alternatively, the server may respond to the native-command by sending an error code response. In this case, further communication between the client and server continues to utilize the SDTP protocol rather than switching to the native protocol.

Once communication switches to the native protocol, further SDTP communications are dependent on the native protocol reinstalling the SDTP server on the link after the transfer is completed. However, the SDTP client is disconnected and will have to reestablish an SDTP connection to use SDTP services. Typically this is done by disconnecting the link altogether and then reconnecting. If the devices are permanently connected, however, then an application-level "reset" could be executed to force the SDTP server to reinitialize and send the SDTP tag line message 301 once again.

Figure 6:
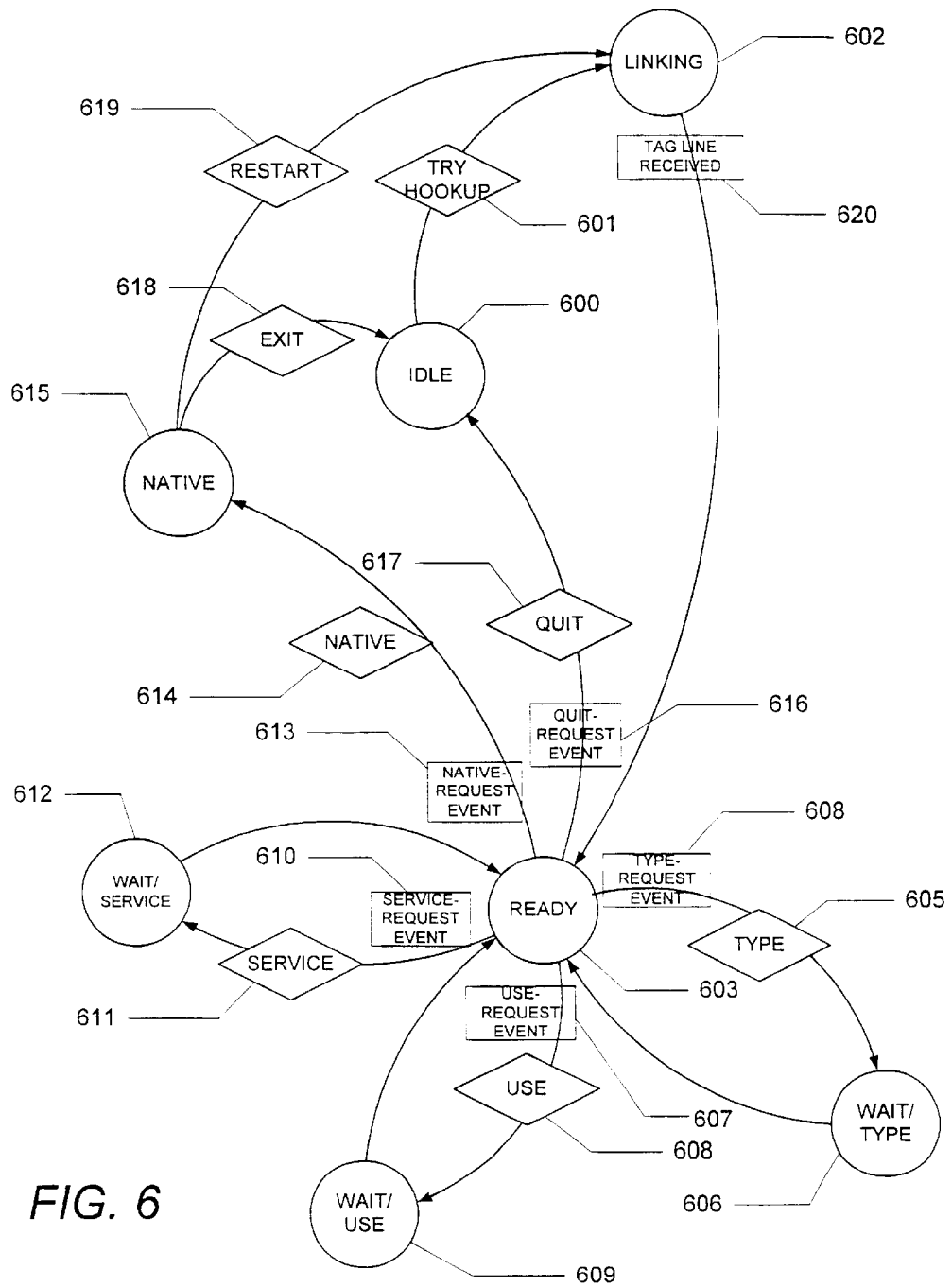
FIG. 6 is a state diagram illustrating the operation of the protocol of the present invention in a client.
Figure 7:
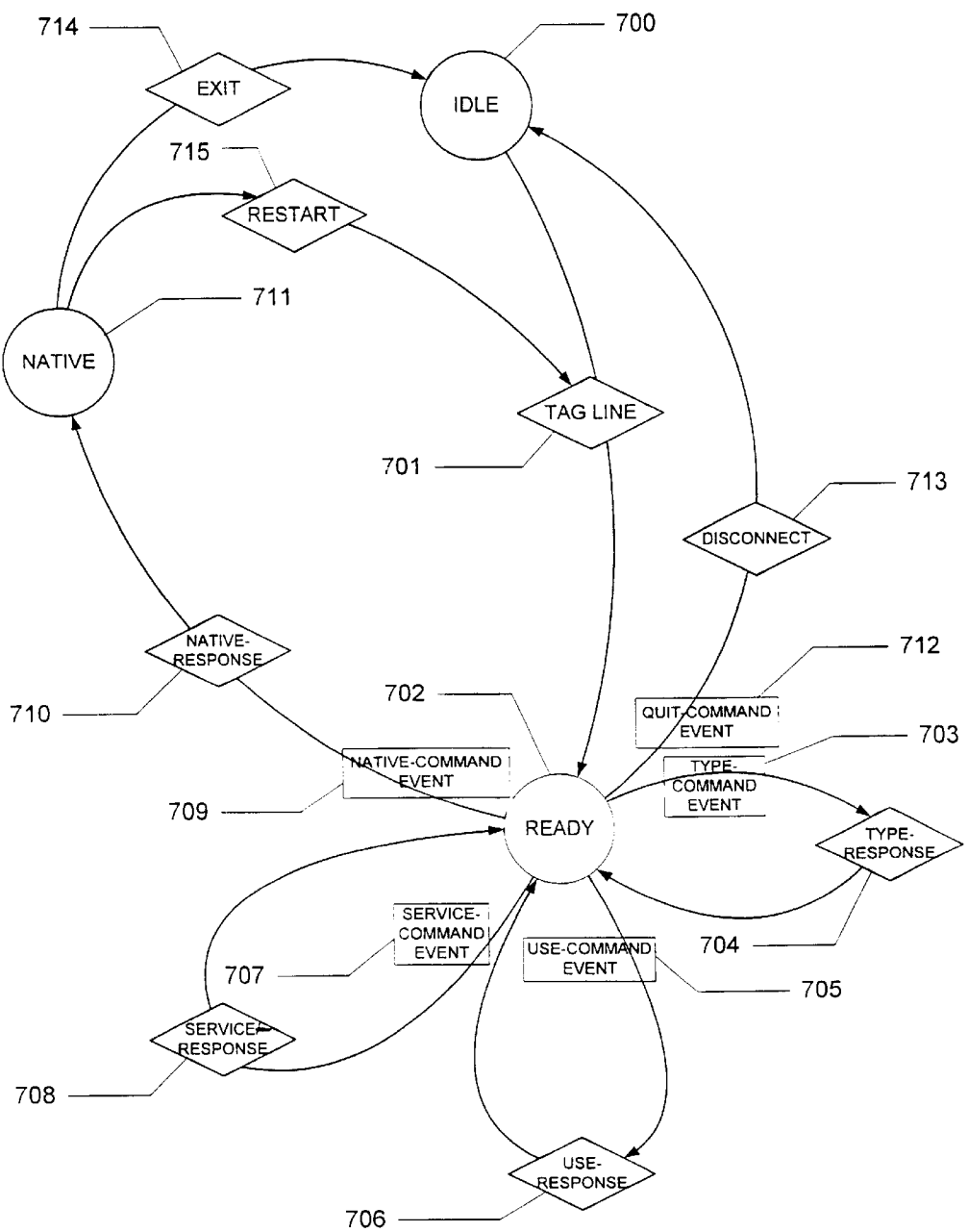
FIG. 7 is a state diagram illustrating the operation of the protocol of the present invention in a server.

FIGS. 6–7 are state diagrams illustrating the operation of the client device and the server device, respectively, using an exemplary embodiment of the protocol of the present invention. Operation of the protocol in both the client device and the server device includes multiple static states and multiple transitional states. The static states are shown as solid circles and represent the status of a device at a given time.

Transitions from one static state to the next occur in response to specific events. The events triggering such a transition vary from static state to static state, so an event triggering a transition when a device is in one state does not necessarily effect such a transition when the device is in another state. Once a device enters a particular static state, the device remains in that state until one of the triggering events associated with that state occur.

The events which trigger a transition are outside the control of the protocol. In a preferred embodiment, operation of the protocol is controlled by a higher-level application. Thus, the application controls when a particular triggering event occurs.

A transition between static states may result in passing through one or more transitional states. In a transitional state, a specific action is performed and the transitional state is automatically exited upon completing the action. The automatic transition from a transitional state is illustrated by a broken line. Thus, each event results in a transition from one static state to another static state with the possibility of passing through a transitional state.

As shown in FIG. 6, the operation of a client device using the protocol of the present invention includes seven static states (IDLE 600, LINKING 602, READY 603, WAIT/TYPE 606, WAIT/USE 609, WAIT/SERVICE 612 and NATIVE 615) and eight transitional states (TRY HOOKUP 601, TYPE 605, USE 608, SERVICE 611, NATIVE 614, QUIT 617, EXIT 618 and RESTART 619). The static states are defined as follows:

IDLE the client device is not currently in communication with the server device;

LINKING the client device has attempted to initialize communication with the server device but has not yet received a SDTP tag line message from the server device;

READY the client device has established communication with the server device and is ready to send a command to the server device;

WAIT/TYPE the client device is waiting on a response to the type-command;

WAIT/USE the client device is waiting on a response to the use-command;

WAIT/SERVICE the client device is waiting on a response to a request for a particular service; and NATIVE communication with the server device using the SDTP protocol has been discontinued, but the underlying link is still in existence.

The transitional states are shown as diamond boxes and represent a particular action taken by the client. The actions taken are defined as follows:

TRY HOOKUP the client device sends a link request to the server device;

TYPE the client device sends a type-command to the server device;

USE the client device sends a use-command to the server device;

SERVICE the client device sends a service-command to the server device;

NATIVE the client device sends a native-command to the server device requesting that the server device switch communications to native;

QUIT the client device sends a quit-command to the server device;

EXIT the client device ends all communications with the server device; and

RESTART in some circumstances, the client device requests SDTP to be reestablished directly.

Initially, the IDLE state 600 is active. If communication with a target server device is desired, the IDLE state 600 is exited and at 601 the client transmits the appropriate signal or signals to the target server device before entering the LINKING state 602. Any communications between the client device and the target server device are being carried out using an underlying link protocol as described previously. While in the LINKING state 602, the client device may receive a tag line message 301 from the target server device indicating that the device is SDTP-enabled. When the tag line message is received 620, the READY state 603 is entered.

The READY state 603 is the basic operational state of the SDTP protocol on a client device. A transition out of the READY state 603 occurs in response to one of several events. In response to a type-request event 604, a type-command 605 is sent to discover the type and services of the target server device, now referred to as the server device. After sending the type-command 605 the WAIT/TYPE state 606 is entered. If the client device receives a response to the type-command, the READY state 603 is re-entered. Another event that may occur in the READY state 603 is the occurrence of a use-request event 607. In response to a use-request event 607, a use-command 608 is sent to discover how to use a particular service. After sending a use-command 608 the WAIT/USE state 609 is entered. If the client device receives a response to the use-command, the READY state 603 is re-entered. Another event that may occur is the occurrence of a service-request event 610. In response to a service-request event 610, a service-command 611 is sent to request that a particular service be performed by the server device. After sending a service-command 611 the WAIT/SERVICE state 612 is entered. If the client device receives a response to the service-command, the READY state 603 is re-entered. Another event that may occur is the occurrence of a native-request event 613. In response to a native-REQUEST EVENT 613, a native-command is sent to halt communications using the SDTP protocol and initiate communications between the two devices using a native protocol. After sending the native-command 614 the NATIVE state 615 is entered. Another event that may occur is the occurrence of a quit-request event 616. In response to a quit-request event 616, a quit-command 617 is sent to halt communications between the two devices. After sending the quit-command 617 to the server device the IDLE state 600 is re-entered.

In the NATIVE state 615, the client device may continue communicating with the server device using some other data protocol, such as Simple Mail Transfer Protocol ("SMTP") or HyperText Transfer Protocol ("HTTP"). Generally, when no further communication between the client device and the server device is desired, an exit procedure 618 is performed and the IDLE state 600 is re-entered. Communications using the SDTP protocol may then be reinitialized as described previously. As previously described, however, there are some cases in which a client device in the NATIVE state 615 can directly request SDTP communications to be renewed by issuing a restart signal 619 to the client device forcing a return to the LINKING state 602. After issuing a restart signal 619, the client device re-enters the LINKING state 602.

As shown in FIG. 7, operation of a server device using the protocol of the present invention includes three static states (IDLE 700, READY 702 and NATIVE 711) and eight transitional states (TAG LINE 701, TYPE-RESPONSE 704, USE-RESPONSE 706, STATUS-RESPONSE 708, NATIVE-RESPONSE 710, DISCONNECT 713, EXIT 714 and RESTART 715). The static states are shown as solid circles and represent the status of the server at a given time. The static states are defined as follows:

IDLE the server device is not currently in communication with a client device;

READY the server device has established communication with the client device and is ready to receive commands from the client device; and NATIVE communication with the client device using the SDTP protocol has been discontinued, but the underlying link is still in existence.

The transitional states are shown as diamond boxes and represent a particular action taken by the server. The actions that are included are defined as follows:

TAG LINE the server device sends the SDTP tag line message to the client device;

TYPE-RESPONSE the server device sends the client device a type-response comprising a list of device and service identifiers;

USE-RESPONSE the server device sends the client device a use-response explaining the operation of a particular service identified by the client device;

STATUS-RESPONSE the server device performs a requested service and sends a status response to the client device;

NATIVE-RESPONSE the server device sends a native-response acknowledging that communications using SDTP will be discontinued;

DISCONNECT the server device ends SDTP communications with the client device and disconnects from the client device;

EXIT the server device ends all communications with the client device and disconnects from the client device; and RESTART the server device is restarted to directly reinitiate further SDTP communications.

Initially, the IDLE state 700 is active. If another device attempts to communicate with the server device using the link protocol described previously, the IDLE state 700 is exited and a tag line message 701 is transmitted to the client device. After transmitting the tag line message 701, the READY state 702 is entered.

The READY state 702 is the basic operational state of the SDTP protocol on the server device. A transition out of the READY state 702 occurs in response to one of several events. One event is the reception of a type-command 605 from the client device. In response to a type-command event 703, the server device sends the device id of the server device and its available services type-response 704 to the client device and returns to the READY state 702. Another event that may occur is the reception of a use-command 608 from the client device. In response to a use-command event 705, the server device sends a use-response 706 to the client device and then returns to the READY state 702. Another event that may occur is the reception of a service-command 611. In response to a service-command event 707, the identified service is performed and a service-response is sent 708, and operation returns to the READY state 702. Another event that may occur is the reception of a native-command 614 ordering SDTP protocol communications to be halted so that communications between the two devices may be carried out using a native protocol. In response to a native-command event 709, the server sends a native-response 710 and then enters the NATIVE state 711. Another event that may occur is the reception of a quit-command 617 from the client device. In response to a quit-command event 712, the server device disconnects the client 713 and reenters the IDLE state 700.

Once the NATIVE state 707 is entered, the server device may continue communicating with the client device using some other data protocol as described previously. Generally, when no further communication between the client device and the server device is desired, an exit procedure 714 is performed and the server returns to the IDLE state 700. Communications using the SDTP protocol may then be reinitialized as described previously. However, there are some cases in which a server device in the NATIVE state 711 can respond to a request for the renewal of SDTP communications directly by issuing a restart signal at 715 and then resending the SDTP tag line message 701.

From the foregoing description, it will be appreciated that the present invention provides a protocol and a method for facilitating communication between various electronic devices and enabling the devices to share features, functionality and information. Although the present invention has been described using various examples and command formats, it will be appreciated that the present invention is not limited by these examples.

The present invention may be implemented and embodied in a variety of devices and may be implemented in software or hardware. In addition, the operation, steps and procedures of the present invention may be implemented in a variety of programming languages. The specification and the drawings provide an ample description of the operation, steps and procedures of the present invention to enable one of ordinary skill in the art to implement the various aspects of the present invention.

The present invention has been described in detail with particular reference to exemplary embodiments. It is understood that variations and modifications can be effected within the spirit and scope of the invention, as described herein before, and as defined in the appended claims. The corresponding structures, materials, acts, and equivalents of all means or step plus function elements in the claims below are intended to include any structure, material, or acts for performing the functions in combination with other claimed elements as specifically claimed.

What is claimed is:

1. A method of communicating between a client device and a server device over a communications link, the method comprising the steps of:

under control of a client device, initiating establishment of a link layer connection between the client device and a specified server device;

under control of the server device, establishing a data connection with the client device over the link layer connection by transmitting a tag line message to the client device that identifies a specified data protocol with which the server device is capable of communicating, the established data connection based on the specified data protocol; and subsequent to the establishment of the data connection, transmitting a service-command from the client device to the server device over the data connection, the service-command identifying a particular service to be performed by the server device; and in response to receiving the service-command at the server device, initiating the requested service and transmitting a status-response to the client device over the data connection.

2. The method of claim 1 wherein the specified data protocol is SDTP.

3. The method of claim 1 further comprising, prior to the transmitting of the service-command, the steps of:

transmitting a type-command from the client device to the server device over the data connection, the type-command requesting the server device to provide service information identifying a set of services offered by the server device; and in response to the type-command, transmitting the service information from the server device to the client device.

4. The method of claim 3 wherein the transmitting of the service information further comprises transmitting a plurality of device types supported by the server device.

5. The method of claim 1 further comprising, prior to the transmitting of the service-command, the steps of:

transmitting a use-command from the client device to the server device over the data connection, the use-command requesting the server device to provide use information describing how to invoke one of a set of services offered by the server device; and in response to the use-command, transmitting the use information from the server device to the client device.

6. A device that is capable of communicating over a communications link with a plurality of server devices of a plurality of device types, the device comprising:

a communications link interface; and a processing unit, the processing unit being operable to send and receive data over the communications link and being operable to, for each of the plurality of server devices:

establish a communicative connection between the device and the server device;

obtain service information over the communicative connection that identifies a set of services offered by the server device, wherein the obtaining of the service information by the device includes receiving a response to a type-command that was sent to the server device by the device; and invoke one of the set of services offered by the server device.

7. The device of claim 6, wherein the processing unit is further operative to obtain use information over the communicative connection that identifies how to invoke a particular service of the set of services offered by the particular server device.

8. The device of claim 7 wherein the use information identifying how to invoke a service includes identifications of parameters used when invoking the service and of permissible values for the identified parameters.

9. The device of claim 6 wherein the processing unit is further operative to obtain supported device information over the communications link that identifies at least one type of device that is supported by the server device.

10. The device of claim 9 wherein at least some of the server devices each support multiple types of devices by emulating at least some of those multiple device types, and wherein the supported device information that is obtained by the device for those server devices identifies the multiple types of devices supported by those server devices.

11. A method by which a common data protocol is used to enable a first device of a first device type to communicate with a second device of a second device type over a first communications link, to enable the second device to communicate with a third device of a third device type over a second communications link, and to enable the third device to communicate with the first device over a third communications link, the first device and the second device together forming a first device pair, the second device and the third device together forming a second device pair, and the third device and the first device together forming a third device pair, wherein one of the devices in each of the first, second and third device pairs is a client device and the other of the devices in each of the first, second and third device pairs is a server device, the device pairs such that at least one of the devices is a client device in one device pair and is a server device in another device pair, the method comprising the steps of, for each device pair:

establishing a connection between the client device of the device pair and the server device of the device pair using a link protocol;

using the link protocol to establish communication between the client device and the server device using the common data protocol;

transmitting a type-command from the client device to the service device using the common data protocol, the type-command requesting the service device to provide service information identifying services offered by the server device; and in response to the type-command, transmitting the service information from the server device to the client device.

12. The method of claim 11, further comprising the steps of:

transmitting a use-command from the client device of the device pair to the server device of the device pair using the common data protocol, the use-command requesting the server device to provide use information describing use of one of the services offered by the server device; and in response to the use-command, transmitting the use information from the server device to the client device.

13. The method of claim 11, further comprising the steps of:

transmitting a service-command from the client device of the device pair to the server device of the device pair using the common data protocol, the service-command identifying a particular service to be performed by the server device; and in response to the service-command, initiating the requested service and transmitting a status-message to the client.

14. A method for enabling a client device to communicate with a server device over a communications link, the method comprising the steps of:

establishing a communicative connection with the server device;

subsequent to establishing the communicative connection, transmitting a type-command to the server device, the type-command requesting the server device to provide service information defining a set of services offered by the server device;

receiving the service information; and subsequent to receiving the service information, transmitting a service-command to the server device, the service-command identifying a particular service to be performed by the server device.

15. The method of claim 14, further comprising the steps of:

subsequent to establishing the communicative connection, transmitting a use-command to the server device, the use-command requesting the server device to provide use information defining the requirements for invoking one of a set of services offered by the server device; and receiving the use information.

16. A method for enabling a server device to communicate with a client device over a communications link, the method comprising the steps of:

establishing a communications link with the client device;

receiving a type-command from the client device, the type-command requesting the server device to provide service information defining a set of services offered by the server device;

in response to receiving the type-command from the client device, transmitting the service information to the client device;

receiving a service-command identifying a particular service to be performed by the server device; and initiating the requested service.

17. The method of claim 16, further comprising the steps of:

receiving a use-command from the client device, the use-command requesting the server device to provide use information defining the requirements for invoking one of a set of services offered by the server device; and in response to receiving the use-command from the client device, transmitting the use information to the client device.

18. A device that is capable of communicating over a communications link with a plurality of server devices of a plurality of device types, the device comprising:

a communications link interface; and a processing unit, the processing unit being operable to send and receive data over the communications link, being operative to obtain supported device information over the communications link that identifies at least one type of device that is supported by the server device, and being operable to, for each of the plurality of server devices:

establish a communicative connection between the device and the server device;

obtain service information over the communicative connection that identifies a set of services offered by the server device, wherein the obtaining of the supported device information by the device includes receiving a response to a type-command that was sent to the server device by the device; and invoke one of the set of services offered by the server device.

19. A device that is capable of communicating over a communications link with a plurality of server devices of a plurality of device types, the device comprising:

a communications link interface; and a processing unit, the processing unit being operable to send and receive data over the communications link, being operative to obtain use information over the communicative connection that identifies how to invoke a particular service of the set of services offered by the particular server device, and being operable to, for each of the plurality of server devices:

establish a communicative connection between the device and the server device;

obtain service information over the communicative connection that identifies a set of services offered by the server device, wherein the obtaining of the use information by the device includes receiving a response to a use-command that was sent to the server device by the device; and invoke one of the set of services offered by the server device.

20. A method for enabling a client device to communicate with a server device over a communications link, the method comprising the steps of:

establishing a communicative connection with the server device;

after establishing the communicative connection, transmitting to the server device a use-command requesting the server device to provide use information that describes how to invoke a specified one of multiple services offered by the server device;

receiving the use information; and after receiving the use information, transmitting a service-command to the server device requesting the server device to invoke the specified service, the service-command specified in a manner based on a description included in the received use information.

21. The method of claim 20 including, prior to the transmitting of the use-command to the server device, receiving service information from the server device that identifies the multiple services offered by the server device, and wherein the specified service is selected from the multiple services identified in the received service information.

22. The method of claim 21 wherein the service information is received from the server device in response to a prior type-command transmitted to the server device.

* * * * *